(12) United States Patent
Tabata (10) Patent No.: US 11,769,358 B2
(45) Date of Patent: Sep. 26, 2023

(54) VEHICLE RECORDING CONTROL DEVICE, VEHICLE RECORDING DEVICE, VEHICLE RECORDING CONTROL METHOD, AND COMPUTER PROGRAM

(71) Applicant: JVCKENWOOD Corporation, Yokohama (JP)

(72) Inventor: Kiyofumi Tabata, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 32 days.

(21) Appl. No.: 16/999,113

(22) Filed: Aug. 21, 2020

(65) Prior Publication Data

US 2020/0380806 A1 Dec. 3, 2020

Related U.S. Application Data

(63) Continuation of application No. PCT/JP2019/023553, filed on Jun. 13, 2019.

(30) Foreign Application Priority Data

Dec. 26, 2018 (JP) .................. 2018-243457

(51) Int. Cl.
*G07C 5/08* (2006.01)
*B60W 30/095* (2012.01)

(52) U.S. Cl.
CPC ........ *G07C 5/0866* (2013.01); *B60W 30/0956* (2013.01); *B60W 2554/4041* (2020.02); *B60W 2554/4044* (2020.02); *B60W 2554/4046* (2020.02); *B60W 2554/4049* (2020.02)

(58) Field of Classification Search
None
See application file for complete search history.

(56) References Cited

U.S. PATENT DOCUMENTS

| 2013/0135473 A1 | 5/2013 | Lin et al. | |
| 2016/0260161 A1* | 9/2016 | Atchley | G05D 1/0219 |
| 2018/0357484 A1* | 12/2018 | Omata | G06K 9/00818 |

(Continued)

FOREIGN PATENT DOCUMENTS

| CN | 1384008 | 12/2002 |
| CN | 204989975 | 1/2016 |

(Continued)

OTHER PUBLICATIONS

Machine translation of Abstract for KR20110007228 (Year: 2023).*

(Continued)

*Primary Examiner* — Isaac G Smith
*Assistant Examiner* — Jennifer M Anda
(74) *Attorney, Agent, or Firm* — AMIN, TUROCY & WATSON, LLP (57) ABSTRACT

Provided are a video data acquisition unit that acquires video data; an event detection unit that detects an event; a recording function control unit that operates a parking recording function for storing video data, based on detection of the event, while the vehicle is parked; a surrounding information acquisition unit that acquires surrounding information; and a determination unit that determines whether the vehicle is in an environment where there is a high risk of an object colliding with the vehicle, based on the surrounding information.

7 Claims, 6 Drawing Sheets

(56) References Cited

U.S. PATENT DOCUMENTS

| | | | | |
|---|---|---|---|---|
| 2019/0188930 A1* | 6/2019 | Tsukahara | ................ | G07C 5/00 |
| 2020/0079371 A1* | 3/2020 | Sakamoto | .............. | G06V 40/20 |
| 2021/0097315 A1* | 4/2021 | Carruthers | ....... | G08B 13/19645 |

FOREIGN PATENT DOCUMENTS

| | | | | | |
|---|---|---|---|---|---|
| JP | 2009-280109 | | 12/2009 | | |
| JP | 2009280109 A | * | 12/2009 | ........... | G07C 5/0866 |
| JP | 2011-090645 | | 5/2011 | | |
| JP | 2018-041122 | | 3/2018 | | |
| JP | 2018-055630 | | 4/2018 | | |
| KR | 2011007228 | * | 7/2011 | ............ | B62D 41/00 |
| KR | 20150096868 A | * | 8/2015 | | |
| WO | 2016/016768 | | 2/2016 | | |

OTHER PUBLICATIONS

International Search Report and Written Opinion for International Application No. PCT/JP2019/023553 dated Aug. 13, 2019, 10 pages.

Extended European Search Report for European Patent Application No. 19904938.8 dated Apr. 30, 2021.

\* cited by examiner

VEHICLE RECORDING CONTROL DEVICE, VEHICLE RECORDING DEVICE, VEHICLE RECORDING CONTROL METHOD, AND COMPUTER PROGRAM

CROSS-REFERENCE TO RELATED APPLICATION(S)

This application is a Continuation of PCT international application Ser. No. PCT/JP2019/023553 filed on Jun. 13, 2019 which designates the United States, incorporated herein by reference, and which claims the benefit of priority from Japanese Patent Application No. 2018-243457, filed on Dec. 26, 2018, incorporated herein by reference.

BACKGROUND

1. Technical Field

The present invention relates to a vehicle recording control device, a vehicle recording device, a vehicle recording control method, and a computer program.

2. Description of the Related Art

A vehicle recording device includes a parking recording function for recording an event that occurs while a vehicle is parked. In the technology, the parking recording function is operated by receiving a power supply from a built-in battery of the vehicle recording device or a battery of the vehicle. In the technology, the parking recording function can be operated for a long period of time by reducing the power consumption, by activating an event detection function while the vehicle is parked, and start recording after an event is detected.

When power is supplied from the built-in battery of the vehicle recording device or the battery of the vehicle, the operation time is limited by the remaining capacity of the battery. Moreover, when recording is started after the event is detected, video data at the time when the event is detected and before the event is detected will not be recorded. Consequently, it may become difficult to properly grasp the state when the event is detected, from the video data.

SUMMARY

It is an object of the present disclosure to at least partially solve the problems in the conventional technology.

To solve the above problem, and achieve the above object, a vehicle recording control device according to the present invention, comprising: a video data acquisition unit that acquires video data captured by an image capturing unit for capturing an image of a surrounding of a vehicle; an event detection unit that detects an event occurring on the vehicle; a recording function control unit that operates a parking recording function for storing the video data based on detection of the event, while the vehicle is parked; a surrounding information acquisition unit that acquires surrounding information of the vehicle; and a determination unit that determines whether the vehicle is in an environment where there is a high risk of an object colliding with the vehicle, based on the surrounding information acquired by the surrounding information acquisition unit, wherein depending on a determination made by the determination unit, the recording function control unit switches between: a first parking recording that causes the image capturing unit to start capturing an image upon detecting an event and that stores video data of a predetermined period, as event recorded data; and a second parking recording that continuously records video data captured by the image capturing unit, and upon detecting an event, that stores video data of a predetermined period before and after time when the event is detected.

A vehicle recording device according to the present invention, comprising: the vehicle recording control device above; and at least one of an image capturing unit that captures an image of a surrounding of a vehicle, and a recording unit that stores video data.

A vehicle recording control method according to the present invention, comprising: a step of acquiring surrounding information that acquires surrounding information when a vehicle is parking; a step of determining that determines whether the vehicle is in an environment where there is a high risk of an object colliding with the vehicle, based on the surrounding information acquired at the step of acquiring surrounding information; and a step of controlling recording function that switches between: a first parking recording that causes an image capturing unit for capturing an image of a surrounding of the vehicle to start capturing an image upon detecting an event occurring on the vehicle and that stores video data of a predetermined period, as event recorded data; and a second parking recording that continuously records video data captured by the image capturing unit, and upon detecting an event occurring on the vehicle, that stores video data of a predetermined period before and after time when the event is detected, depending on a determination made at the step of determining.

A non-transitory computer readable recording medium storing therein a computer program according to the present invention for causing a computer operating as a vehicle recording control device to execute: a step of acquiring surrounding information that acquires surrounding information when a vehicle is parking; a step of determining that determines whether the vehicle is in an environment where there is a high risk of an object colliding with the vehicle, based on the surrounding information acquired at the step of acquiring surrounding information; and a step of controlling recording function that switches between: a first parking recording that causes an image capturing unit for capturing an image of a surrounding of the vehicle to start capturing an image upon detecting an event occurring on the vehicle and that stores video data of a predetermined period, as event recorded data; and a second parking recording that continuously records video data captured by the image capturing unit, and upon detecting an event occurring on the vehicle, that stores video data of a predetermined period before and after time when the event is detected, depending on a determination made at the step of determining.

DETAILED DESCRIPTION

Hereinafter, embodiments of a vehicle recording control device, a vehicle recording device, a vehicle recording control method, and a computer program according to the present invention will be described in detail with reference to the accompanying drawings. However, the present invention is not limited to the following embodiments.

First Embodiment

Figure 1:
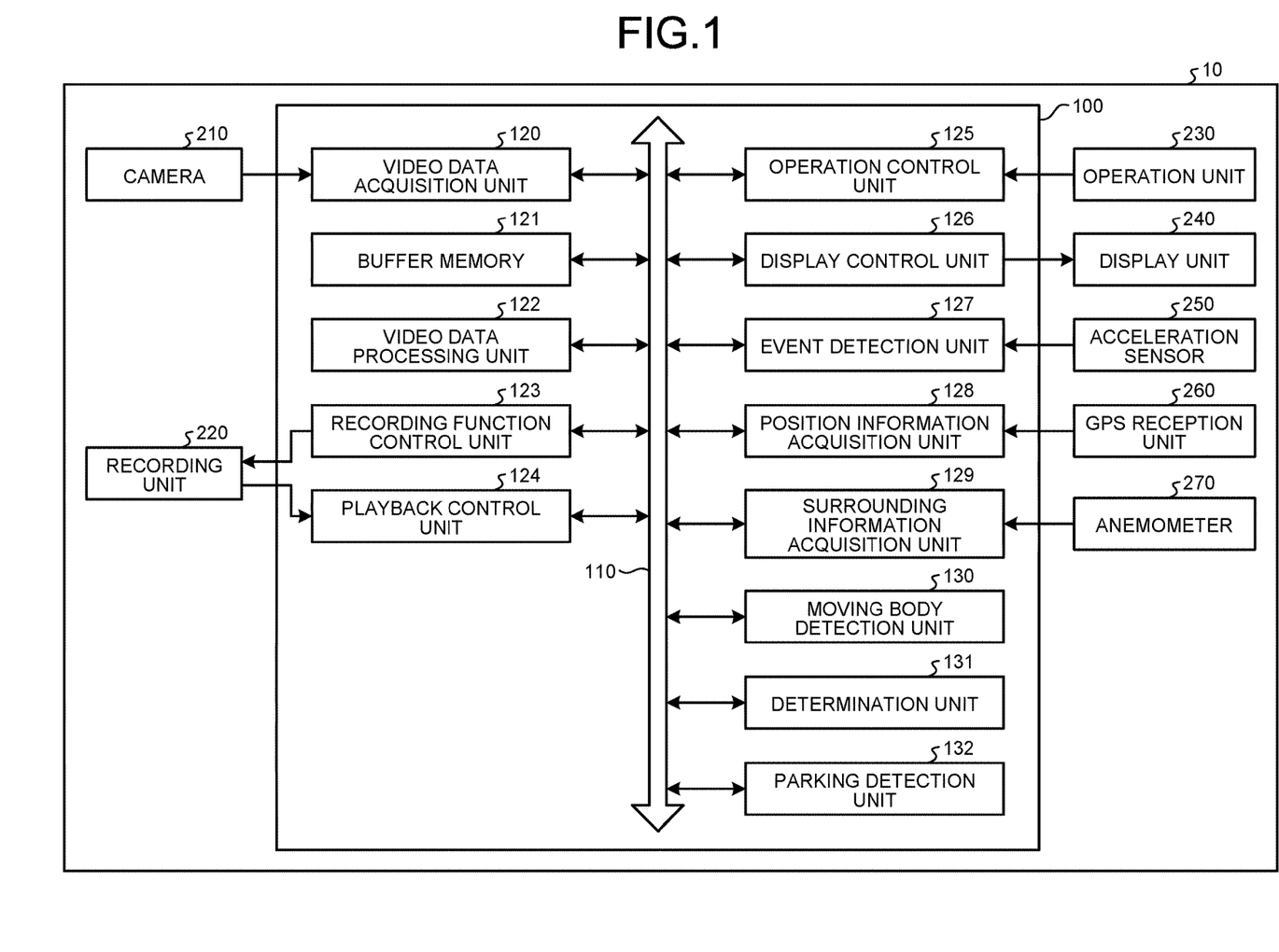
FIG. 1 is a block diagram illustrating a configuration example of a vehicle recording device including a vehicle recording control device according to a first embodiment.

FIG. 1 is a block diagram illustrating a configuration example of a vehicle recording device including a vehicle recording control device according to a first embodiment. A vehicle recording device 10 performs different parking recording functions depending on when the vehicle is in an environment where there is a high risk of an object colliding with the vehicle, and when the vehicle is in an environment other than the above.

The vehicle recording device 10 may be mounted on a vehicle, or may be a portable device that can be used in a vehicle. Moreover, the vehicle recording device 10 can be implemented including the functions or components of a device installed in advance in the vehicle, a navigation device, and the like. The vehicle recording device 10 includes a camera (image capturing unit) 210, a recording unit 220, an operation unit 230, a display unit 240, an acceleration sensor 250, a global positioning system (GPS) reception unit 260, and a vehicle recording control device 100.

The camera 210 is a camera for capturing images of the surroundings of a vehicle. In the present embodiment, the camera 210 is a camera that can capture images of the whole sky of 360 degrees. However, it is not limited thereto, and the camera 210 may also be a single camera facing a single direction, or a group of cameras that capture images of various directions. For example, the camera 210 is disposed in front of the vehicle interior of a vehicle. In the present embodiment, for example, when the accessory power supply is turned OFF, in other words, while the vehicle is parked, upon detecting an event, the camera 210 can store video images of a predetermined period for about several tens of seconds. The camera 210 outputs the captured video data to a video data acquisition unit 120 in the vehicle recording control device 100. For example, the video data is a moving image configured by images of 30 frames per second.

The recording unit 220 is used for temporarily storing data in the vehicle recording device 10. For example, the recording unit 220 is a recording unit such as a semiconductor memory element including a random access memory (RAM), a flash memory, and the like, or a memory card. Alternatively, the recording unit 220 may also be an external recording unit wirelessly connected via a communication device, which is not illustrated. The recording unit 220 records loop recorded video data or event recorded data, on the basis of a control signal output from a recording function control unit 123 in the vehicle recording control device 100.

The operation unit 230 accepts various operations on the vehicle recording device 10. For example, the operation unit 230 accepts an operation for manually storing the captured video data in the recording unit 220, as the event recorded data. For example, the operation unit 230 accepts an operation for playing back the loop recorded video data or the event recorded data recorded in the recording unit 220. For example, the operation unit 230 accepts an operation for eliminating the event recorded data recorded in the recording unit 220. For example, the operation unit 230 accepts an operation for finishing loop recording. The operation unit 230 outputs the operation information to an operation control unit 125 in the vehicle recording control device 100.

For example, the display unit 240 is a display device dedicated to the vehicle recording device 10, a display device used in common with another system including a navigation system, or the like. The display unit 240 may also be integrally formed with the camera 210. For example, the display unit 240 is a display including a liquid crystal display (LCD), an organic electro-luminescence (EL) display, or the like. In the present embodiment, the display unit 240 is disposed on a dashboard, an instrumental panel, a center console, or the like in front of the driver of the vehicle. On the basis of a video signal output from a display control unit 126 in the vehicle recording control device 100, the display unit 240 displays video images. The display unit 240 displays the video images captured by the camera 210, or the video images recorded in the recording unit 220.

The acceleration sensor 250 is a sensor for detecting acceleration generated on the vehicle. The acceleration sensor 250 outputs a detection result to an event detection unit 127 in the vehicle recording control device 100. For example, the acceleration sensor 250 is a sensor for detecting acceleration in the three-axial directions. The three-axial directions include the front-rear direction, the left-right direction, and the up-down direction of the vehicle.

The GPS reception unit 260 receives radio waves from a GPS satellite, which is not illustrated. The GPS reception unit 260 outputs the received radio wave signal to a position information acquisition unit 128 in the vehicle recording control device 100.

For example, the vehicle recording control device 100 is an arithmetic processing device (control device) configured of a central processing unit (CPU) and the like. The vehicle recording control device 100 loads a stored computer program into a memory, and executes a command included in the computer program. The vehicle recording control device 100 includes an internal memory, which is not illustrated, and the internal memory is used for temporarily storing data in the vehicle recording control device 100, and the like. The vehicle recording control device 100 includes the video data acquisition unit 120, a buffer memory 121, a video data processing unit 122, the recording function control unit 123, a playback control unit 124, the operation control unit 125, the display control unit 126, the event detection unit 127, the position information acquisition unit 128, a surrounding information acquisition unit 129, a moving body detection unit 130, a determination unit 131, and a parking detection unit 132 connected to a bus 110.

The video data acquisition unit 120 acquires video data obtained by capturing the images of the surroundings of the vehicle. More specifically, the video data acquisition unit 120 acquires the video data output from the camera 210, and outputs the video data to the buffer memory 121.

The buffer memory 121 is an internal memory in the vehicle recording control device 100, and is a memory for temporarily recording video data of a certain period acquired by the video data acquisition unit 120, while the video data is updated.

For example, the video data processing unit 122 converts the video data temporarily stored in the buffer memory 121 to any file format such as MP4 format encoded with any codec including H.264, moving picture experts group (MPEG-4), and the like. The video data processing unit 122 generates video data that is a file of a certain period, from the video data temporarily stored in the buffer memory 121. More specifically, the video data processing unit 122 generates video data of 60 seconds as a file, from the video data temporarily stored in the buffer memory 121, in the recording order. The video data processing unit 122 outputs the generated video data to the recording function control unit 123. Moreover, the video data processing unit 122 outputs the generated video data to the display control unit 126. For example, the period of the video data generated as a file is 60 seconds. However, it is not limited thereto. The video data in this example may also be data including voice in addition to the video images captured by the camera 210.

The recording function control unit 123 controls to cause the recording unit 220 to record the video data converted into a file by the video data processing unit 122. During a period when loop recording is performed, such as when the accessory power supply of the vehicle is turned ON, the recording function control unit 123 records the video data converted into a file by the video data processing unit 122 in the recording unit 220, as rewritable video data. More specifically, during a period when loop recording is performed, the recording function control unit 123 keeps recording the video data generated by the video data processing unit 122 in the recording unit 220. Then, when the capacity of the recording unit 220 becomes full, the recording function control unit 123 overwrites the oldest video data with new video data, and records the new video data.

Moreover, when the event detection unit 127 detects an event, the recording function control unit 123 stores the video data of a predetermined period in the video data generated by the video data processing unit 122, in the recording unit 220, as the event recorded data prohibited from being overwritten.

For example, as for the event recorded data to be stored in the recording unit 220 by the recording function control unit 123, when image capturing is started after an event is detected, video data of a predetermined period of about ten seconds or more to 60 seconds or less after the event is detected and the image capturing is started, is stored as the event recorded data. As for the event recorded data to be stored in the recording unit 220 by the recording function control unit 123, during a period when loop recording is performed, video data of a predetermined period of about ten seconds or more to 60 seconds or less before and after the time when the event is detected, is stored as the event recorded data.

When the accessory power supply of the vehicle is turned OFF, in other words, while the vehicle is parked, the recording function control unit 123 operates the parking monitoring function, and stores the video data captured by the camera 210. More specifically, the parking monitoring function detects an event, and stores the video data by loop recording. Alternatively, the parking monitoring function activates the camera 210 upon detecting an event, and stores the video data.

According to the risk of an object colliding with the vehicle, the recording function control unit 123 executes the first parking recording function or the second parking recording function. More specifically, when the determination unit 131 determines that the vehicle is in an environment where there is a high risk of an object colliding with the vehicle, the recording function control unit 123 performs the first parking recording that causes the camera 210 to start capturing images upon detecting an event, and that stores the video data of a predetermined period as the event recorded data. When the determination unit 131 determines that the vehicle is in an environment where there is a high risk of an object colliding with the vehicle, the recording function control unit 123 performs the second parking recording that continuously records the video data captured by the camera 210, and upon detecting an event, that stores the video data of a predetermined period before and after the time when the event is detected.

As the first parking recording function, the recording function control unit 123 causes the event detection unit 127 to detect an event. Upon acquiring a signal indicating that the event is detected from the event detection unit 127, the recording function control unit 123 activates the camera 210, and causes the camera 210 to capture images of a predetermined period after the event is detected. The recording function control unit 123 causes the recording unit 220 to store the captured video data as the event recorded data.

As the second parking recording function, the recording function control unit 123 causes the event detection unit 127 to detect an event and performs loop recording. Upon acquiring a signal indicating that the event is detected from the event detection unit 127, the recording function control unit 123 causes the recording unit 220 to store the video data of a predetermined period before and after the time when the event is detected, as the event recorded data.

Figure 2:
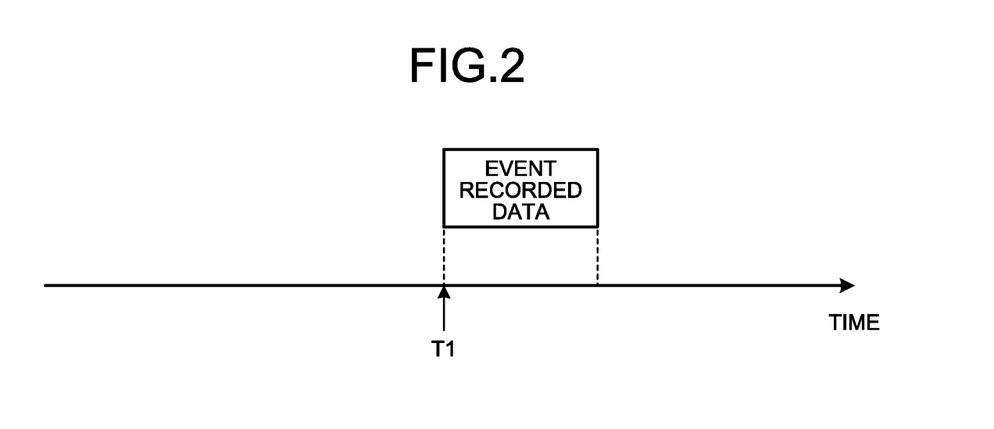
FIG. 2 is a schematic diagram for explaining a first parking recording function.

With reference to FIG. 2, the first parking recording function will be described. In FIG. 2, when an event is detected at time T1, the camera 210 is activated, and video data of a predetermined period after the time T1 is stored in the recording unit 220 as the event recorded data. The time T1 at which the event is detected need not coincide with the time when the camera 210 is activated and when the acquisition of the video data to be stored as the event recorded data is started. A delay corresponding to the time required for activating the camera and the like is also included.

Figure 3:
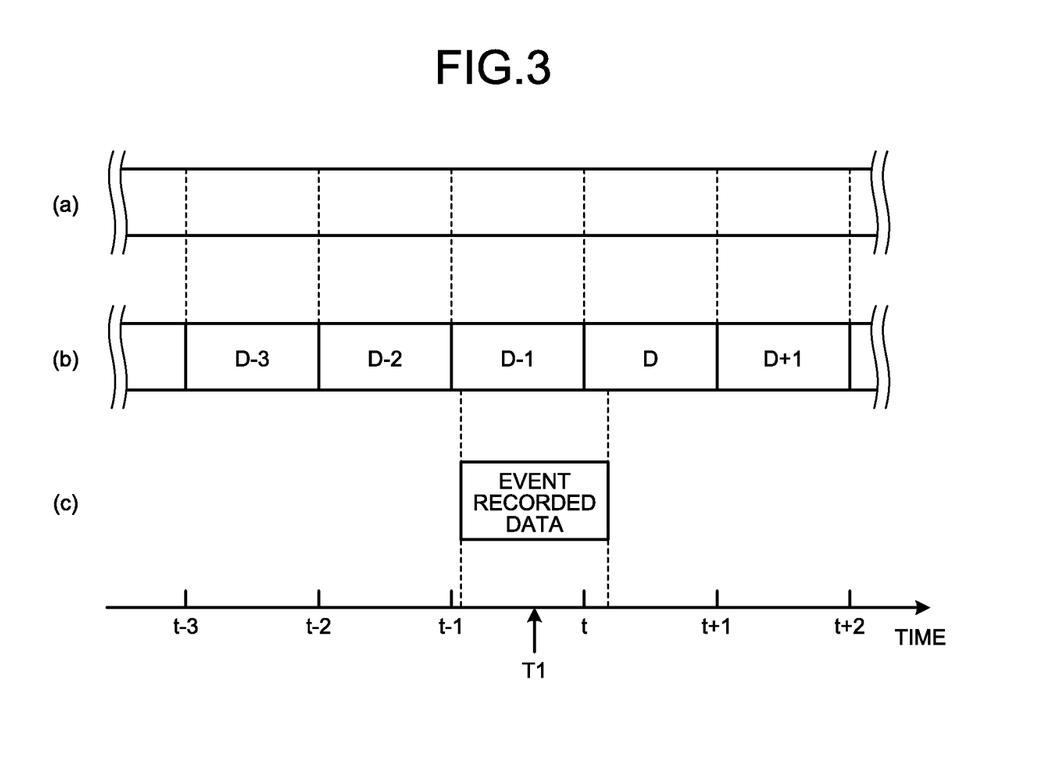
FIG. 3 is a schematic diagram for explaining a second parking recording function.

With reference to FIG. 3, the second parking recording function will be described. As illustrated in FIG. 3(*a*), video data captured by the camera 210 is recorded in the buffer memory 121. As illustrated in FIG. 3(*b*), video data of a predetermined period is cut out from the video data recorded in the buffer memory 121, and files such as loop recorded video data D−3, loop recorded video data D−2, loop recorded video data D−1, loop recorded video data D, loop recorded video data D+1, and the like are generated. The generated files are recorded in the recording unit 220 as rewritable files. Moreover, as illustrated in FIG. 3(*c*), when an event is detected at the time T1, a file that at least includes the time T1, or video data of a predetermined period extracted from the file including the time T1 is stored in the recording unit 220, as the event recorded data.

Returning to FIG. 1, on the basis of a control signal for performing a playback operation output from the operation control unit 125, the playback control unit 124 controls to play back the loop recorded video data or the event recorded data recorded in the recording unit 220.

The operation control unit 125 acquires operation information for operation received by the operation unit 230. For example, the operation control unit 125 acquires storage operation information indicating an operation for manually storing video data, playback operation information indicating a playback operation, or erase operation information indicating an operation for erasing video data, and outputs a control signal. For example, the operation control unit 125 acquires finishing operation information indicating an operation for finishing loop recording, and outputs a control signal.

The display control unit 126 controls the display of video data on the display unit 240. The display control unit 126 outputs a video signal for causing the display unit 240 to output video data. More specifically, the display control unit 126 outputs a video signal for displaying the video images captured by the camera 210, or playing back the loop recorded video data or the event recorded data having been recorded in the recording unit 220.

On the basis of the detection result from the acceleration sensor 250, the event detection unit 127 detects an event occurring on the vehicle. More specifically, when an acceleration equal to or higher than a threshold is detected in the acceleration detected by the acceleration sensor 250, the event detection unit 127 detects the acceleration as an event. The threshold for detecting an event when parking recording is taking place may be set smaller than a threshold used for detecting an event while the vehicle is traveling. For example, when the threshold of acceleration for detecting an event while the vehicle is traveling is about 1 G, the threshold of acceleration for detecting an event when parking recording is taking place may be about 0.3 G.

The position information acquisition unit 128 calculates the current position information of the vehicle, on the basis of radio waves received by the GPS reception unit 260, using a known method.

The surrounding information acquisition unit 129 acquires surrounding information of the vehicle. More specifically, the surrounding information acquisition unit 129 acquires the distance from the other vehicle that is an object adjacent to the vehicle (hereinafter, referred to as an "adjacent other vehicle"), as the surrounding information of the vehicle. The surrounding information acquisition unit 129 may also acquire the surrounding information when the vehicle is parking. For example, when the vehicle is parking, the surrounding information acquisition unit 129 acquires the distance from the adjacent other vehicle, as the surrounding information. The surrounding information acquisition unit 129 may also acquire the surrounding information after the vehicle is parked. For example, when the adjacent other vehicle leaves the parking space after the vehicle is parked, the surrounding information acquisition unit 129 acquires the distance from the adjacent other vehicle, as the surrounding information. Alternatively, for example, when the adjacent other vehicle enters the parking space after the vehicle is parked, the surrounding information acquisition unit 129 acquires the distance from the adjacent other vehicle, as the surrounding information.

The moving body detection unit 130 detects a moving body in the surroundings of the vehicle. More specifically, after the vehicle is parked, the moving body detection unit 130 detects the moved adjacent other vehicle, as a moving body. For example, when the adjacent other vehicle leaves the parking space while the vehicle is parked, the moving body detection unit 130 detects the adjacent other vehicle, as a moving body. For example, when the adjacent other vehicle enters the parking space while the vehicle is parked, the moving body detection unit 130 detects the entering adjacent other vehicle, as a moving body.

On the basis of the surrounding information acquired by the surrounding information acquisition unit 129, the determination unit 131 determines whether the vehicle is in an environment where there is a high risk of an object colliding with the vehicle. More specifically, when the distance from the adjacent other vehicle that is adjacent to the vehicle is less than a predetermined value, the determination unit 131 determines that the vehicle is in an environment where there is a high risk of an object colliding with the vehicle. For example, when a gap between the vehicle and the adjacent other vehicle is narrow when the vehicle has parked, the determination unit 131 determines that the vehicle is in an environment where there is a high risk of an object colliding with the vehicle.

On the basis of the surrounding information acquired by the surrounding information acquisition unit 129, and the detection result of the moving body detection unit 130, the determination unit 131 may also determine that the vehicle is in an environment where there is a high risk of an object colliding with the vehicle, when the distance from the adjacent other vehicle that is adjacent to the vehicle is less than a predetermined value, and when the adjacent other vehicle that is adjacent to the vehicle and that is a moving body detected after the vehicle is parked has moved. For example, the determination unit 131 determines that the vehicle is in an environment where there is a high risk of an object colliding with the vehicle, when a gap between the vehicle and the adjacent other vehicle is narrow when the vehicle has parked, and when the adjacent other vehicle leaves the parking space while the vehicle is parked.

On the basis of the surrounding information acquired by the surrounding information acquisition unit 129, and the detection result of the moving body detection unit 130, the determination unit 131 may also determine that the vehicle is in an environment where there is a high risk of an object colliding with the vehicle, when the distance between the vehicle and the adjacent other vehicle that is a moving body detected while the vehicle is parked, is reduced to less than a predetermined value. For example, while the vehicle is parked, when the adjacent other vehicle enters the position where a gap between the vehicle and the adjacent other vehicle is narrow, the determination unit 131 determines that the vehicle is in an environment where there is a high risk of an object colliding with the vehicle.

The predetermined value is the distance from the adjacent other vehicle used by the determination unit 131 to determine whether the vehicle is in an environment where there is a high risk of an object colliding with the vehicle. For example, the predetermined value is about equal to or less than 50 cm.

On the basis of the information acquired from the vehicle, the parking detection unit 132 detects that the vehicle is in a parking state.

For example, the vehicle is in a parking state, when the shift position is set to "parking", when the side brake is operated, when the speed becomes zero for five seconds or more, when the engine is stopped, or the like. Alternatively, it is also possible to determine that the vehicle is in a parking state, by any trigger such as user's operation. From when the engine is started to when the engine is stopped, in other words, while the vehicle is operated and not in the parking state, the vehicle recording device 10 continuously records video images, or performs what is called loop recording, and detects an event.

Figure 4:
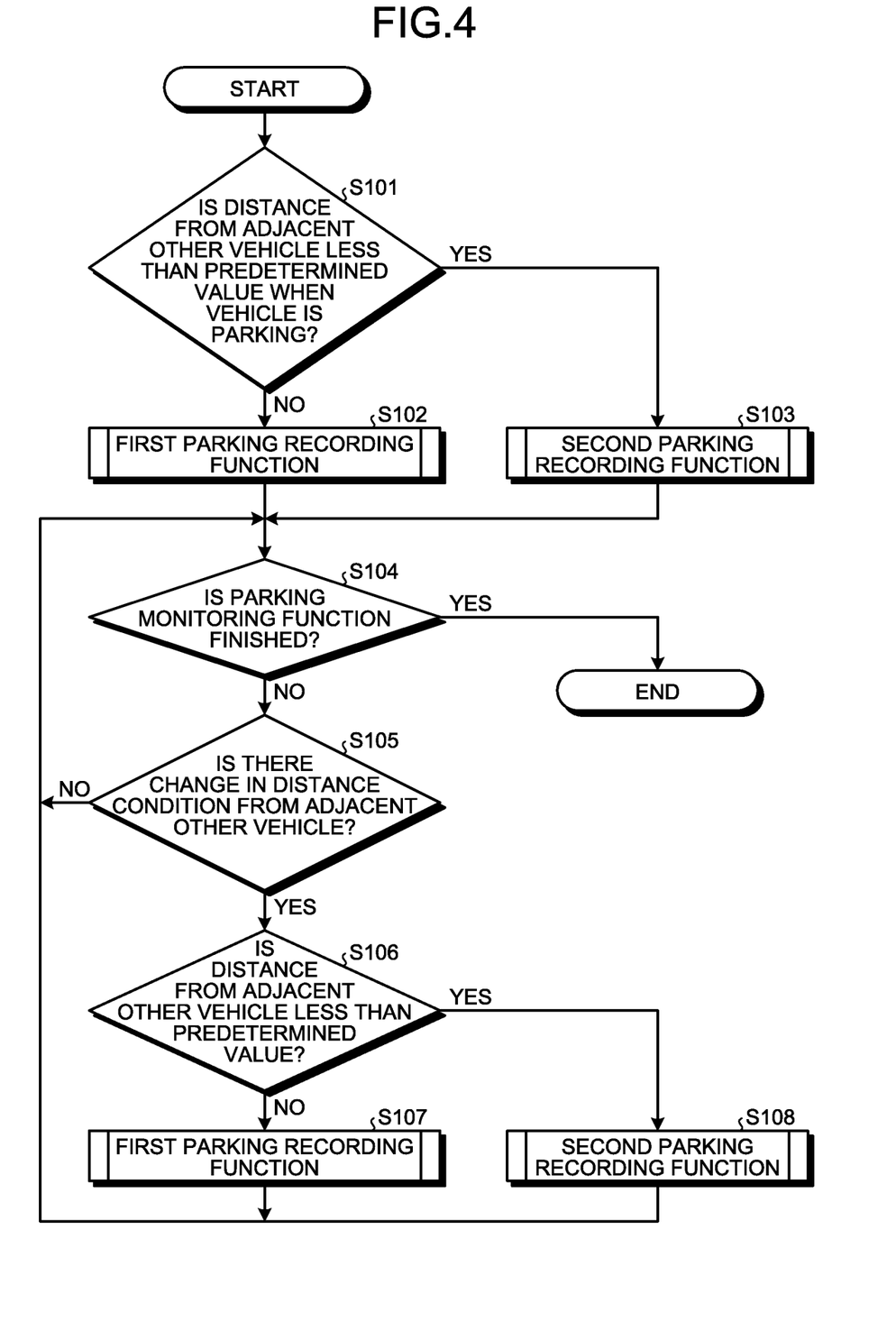
FIG. 4 is a flowchart illustrating a flow of a process performed by the vehicle recording control device according to the first embodiment.

Next, with reference to FIG. 4, a flow of a process performed by the vehicle recording control device 100 will be described. FIG. 4 is a flowchart illustrating a flow of a process performed by the vehicle recording control device according to the first embodiment. While the vehicle is operated, the vehicle recording control device 100 causes the surrounding information acquisition unit 129 to acquire the surrounding information of the surroundings of the vehicle.

The vehicle is operated when the vehicle is not in the parking state, such as when power is supplied to the vehicle recording device 10 from the accessory power supply of the vehicle and the like. The surrounding information of the surroundings of the vehicle may be acquired at any time as required such as when the vehicle is parking, after the vehicle is parked, and the like, in addition to while the vehicle is operated. When the vehicle is stopped, the vehicle recording control device 100 executes the process of the flowchart illustrated in FIG. 4. For example, the vehicle is stopped when the shift position is set to "parking", when the side brake is operated, when the speed becomes zero for five seconds or more, when the engine is stopped, or the like. Alternatively, it is also possible to determine that the vehicle is stopped, by any trigger such as user's operation.

The vehicle recording control device 100 determines whether the distance from the adjacent other vehicle is less than a predetermined value when the vehicle is parking (step S101). More specifically, the vehicle recording control device 100 determines whether the distance from the adjacent other vehicle when the vehicle is parking that is acquired by the surrounding information acquisition unit 129 is less than a predetermined value. When it is determined that the distance from the adjacent other vehicle is less than a predetermined value when the vehicle is parking (Yes at step S101), the vehicle recording control device 100 proceeds to step S103. When it is determined that the distance from the adjacent other vehicle is not less than a predetermined value when the vehicle is parking (No at step S101), the vehicle recording control device 100 proceeds to step S102.

When it is determined that the distance from the adjacent other vehicle is not less than a predetermined value when the vehicle is parking (No at step S101), the vehicle recording control device 100 operates the first parking recording function (step S102). The vehicle recording control device 100 then proceeds to step S104.

When it is determined that the distance from the adjacent other vehicle is less than a predetermined value when the vehicle is parking (Yes at step S101), the vehicle recording control device 100 operates the second parking recording function (step S103). The vehicle recording control device 100 then proceeds to step S104.

While the first parking recording function is operated at step S102, or while the second parking recording function is operated at step S103, the vehicle recording control device 100 determines whether the parking monitoring function is finished (step S104). For example, the parking monitoring function is finished, when the accessory power supply is turned ON, when the parking monitoring function is stopped by the operation of the operation unit 230, and the like.

When it is determined that the parking monitoring function is finished at step S104 (Yes at step S104), the present process is finished. When it is determined that the parking monitoring function is not finished (No at step S104), the process proceeds to step S105.

The vehicle recording control device 100 determines whether there is a change in the distance condition from the adjacent other vehicle (step S105). More specifically, depending on whether the moving body detection unit 130 has detected the adjacent other vehicle as a moving body after the vehicle is parked, the vehicle recording control device 100 determines whether there is a change in the distance condition from the adjacent other vehicle. For example, when the adjacent other vehicle leaves the parking space after the vehicle is parked, the moving body detection unit 130 detects the leaving adjacent other vehicle as a moving body. Alternatively, for example, when the adjacent other vehicle enters the parking space after the vehicle is parked, the moving body detection unit 130 detects the entering adjacent other vehicle, as a moving body. When the adjacent other vehicle is detected as a moving body by the moving body detection unit 130, the vehicle recording control device 100 determines that there is a change in the distance condition from the adjacent other vehicle. When the adjacent other vehicle is not detected as a moving body by the moving body detection unit 130, the vehicle recording control device 100 determines that there is no change in the distance condition from the adjacent other vehicle. When it is determined that there is a change in the distance condition from the adjacent other vehicle (Yes at step S105), the vehicle recording control device 100 proceeds to step S106.

When it is determined that there is no change in the distance condition from the adjacent other vehicle (No at step S105), the vehicle recording control device 100 returns to step S104.

When it is determined that there is a change in the distance condition from the adjacent other vehicle (Yes at step S105), the vehicle recording control device 100 determines whether the distance from the adjacent other vehicle is less than a predetermined value (step S106). More specifically, the vehicle recording control device 100 determines whether the distance from the adjacent other vehicle that is detected as a moving body after the vehicle is parked, and that is acquired by the surrounding information acquisition unit 129, is less than a predetermined value. For example, when the adjacent other vehicle leaves the parking space after the vehicle is parked, and when the distance between the leaving adjacent other vehicle and the vehicle is reduced to less than a predetermined value (Yes at step S106), the vehicle recording control device 100 proceeds to step S108.

Alternatively, for example, when the adjacent other vehicle enters the parking space after the vehicle is parked, and when the distance between the entering adjacent other vehicle and the vehicle is reduced to less than a predetermined value (Yes at step S106), the vehicle recording control device 100 proceeds to step S108. For example, when the adjacent other vehicle leaves the parking space after the vehicle is parked, and when the distance between the leaving adjacent other vehicle and the vehicle is not reduced to less than a predetermined value (No at step S106), the vehicle recording control device 100 proceeds to step S107. For example, when the adjacent other vehicle enters the parking space after the vehicle is parked, and when the distance between the entering adjacent other vehicle and the vehicle is not reduced to less than a predetermined value (No at step S106), the vehicle recording control device 100 proceeds to step S107.

When it is determined that the distance from the adjacent other vehicle is not less than a predetermined value after the vehicle is parked (No at step S106), the vehicle recording control device 100 operates the first parking recording function (step S107). The vehicle recording control device 100 then proceeds to step S104.

When it is determined that the distance from the adjacent other vehicle is less than a predetermined value after the vehicle is parked (Yes at step S106), the vehicle recording control device 100 operates the second parking recording function (step S108). The vehicle recording control device 100 then proceeds to step S104.

After the first parking recording function is operated at step S102, and when it is No at step S104, Yes at step S105, and No at step S106, the first parking recording function operated at step S102 continues at step S107. Moreover, after the second parking recording function is operated at step S103, and when it is No at step S104, Yes at step S105, and Yes at step S106, the second parking recording function operated at step S103 continues at step S108.

Figure 5:
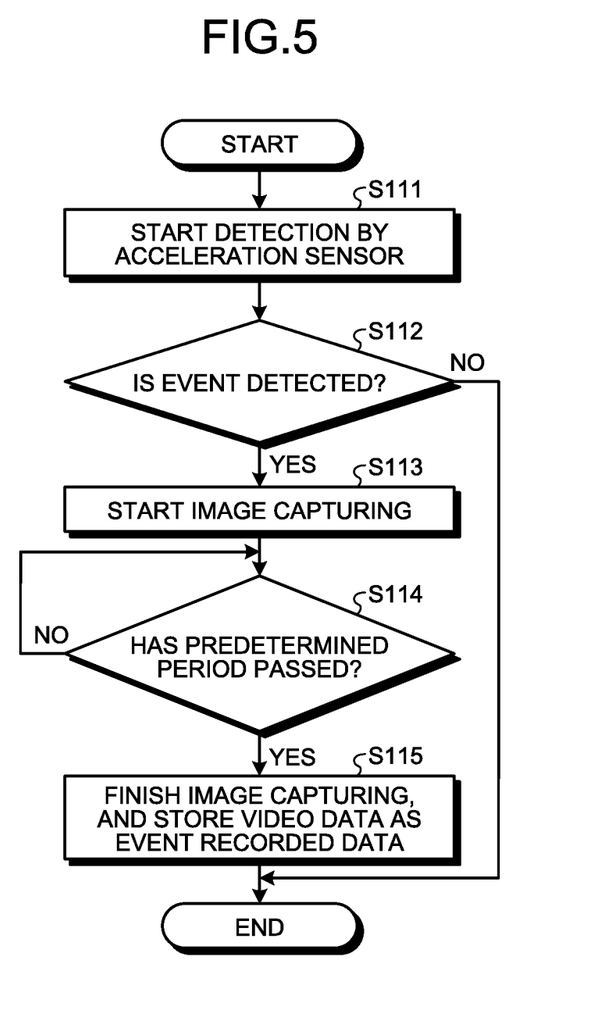
FIG. 5 is a flowchart illustrating a flow of a process performed by the vehicle recording control device according to the first embodiment.

Next, with reference to FIG. 5, as the parking recording function, a flow of a process of the first parking recording function that detects an event and that stores video data will be described. FIG. 5 is a flowchart illustrating a flow of a process performed by the vehicle recording control device according to the first embodiment.

The process in FIG. 5 is started, when the first parking recording function is started. The vehicle recording control device 100 causes the recording function control unit 123 to start detecting an event on the basis of the output from the acceleration sensor 250 (step S111), and proceeds to step S112.

On the basis of the detection result of the acceleration sensor 250, the vehicle recording control device 100 determines whether an event is detected by the event detection unit 127 (step S112). More specifically, when an acceleration equal to or higher than a threshold is detected, the vehicle recording control device 100 determines that the event is detected by the event detection unit 127 (Yes at step S112), and proceeds to step S113. When an acceleration equal to or higher than a threshold is not detected, the vehicle recording control device 100 determines that an event is not detected by the event detection unit 127 (No at step S112), and finishes the present process. When the process is finished in FIG. 5, the process proceeds to step S104 in FIG. 4. While the first parking recording function is performed continuously, the vehicle recording control device 100 performs the processes from step S112 to step S115.

The vehicle recording control device 100 causes the recording function control unit 123 to cause the camera 210 to start capturing images (step S113), and proceeds to step S114.

The vehicle recording control device 100 determines whether a predetermined period has passed (step S114). When it is determined that a predetermined period has passed from the start of image capturing (Yes at step S114), the vehicle recording control device 100 proceeds to step S115. When it is determined that a predetermined period has not passed from the start of image capturing (No at step S114), the vehicle recording control device 100 performs the process at step S114 again.

When it is determined that a predetermined period has passed (Yes at step S114), the vehicle recording control device 100 causes the recording function control unit 123 to finish capturing images, causes the recording unit 220 to store the captured video data as the event recorded data (step S115), and finishes the present process. The event recorded data stored at step S115 is video data of a period from when the image capturing is started at step S113 to when the image capturing is finished at step S115, including when it is determined that a predetermined period has passed at step S114. When the process is finished in FIG. 5, the process proceeds to step S104 in FIG. 4. While the first parking recording function is performed continuously, the vehicle recording control device 100 performs the processes from step S112 to step S115.

Figure 6:
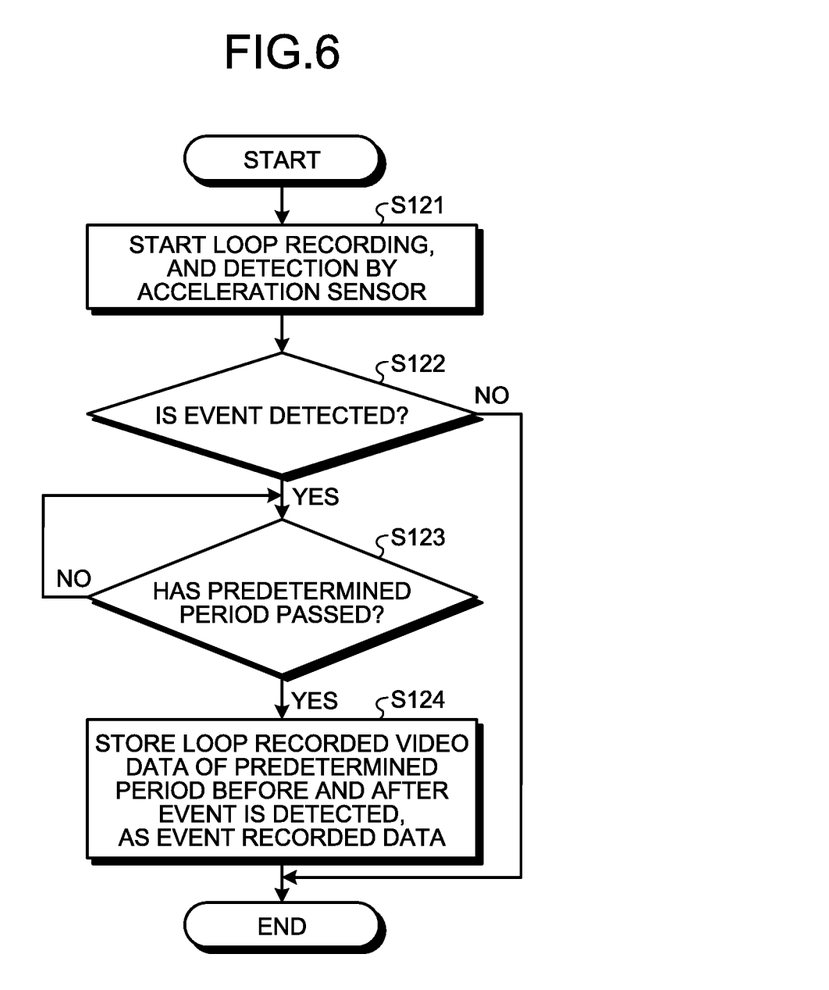
FIG. 6 is a flowchart illustrating a flow of a process performed by the vehicle recording control device according to the first embodiment.

Next, with reference to FIG. 6, as the second parking recording function, a flow of a process that detects an event and that stores video data by loop recording will be described. FIG. 6 is a flowchart illustrating a flow of a process performed by the vehicle recording control device according to the first embodiment. The processes at step S122 and step S123 in FIG. 6 are the same as the processes at step S112 and step S114 in FIG. 5.

The process in FIG. 6 is started when the parking recording function is started. The vehicle recording control device 100 causes the recording function control unit 123 to start loop recording, starts detecting an event on the basis of the output of the acceleration sensor 250 (step S121), and proceeds to step S122.

When it is determined that a predetermined period has passed (Yes at step S123), the vehicle recording control device 100 causes the recording function control unit 123 to store video data of a predetermined period before and after, and including the time when the event is detected, as the event recorded data (step S124). More specifically, the vehicle recording control device 100 causes the video data processing unit 122 to generate video data of a predetermined period before and after, and including the time when the event is detected, as the event recorded data. The vehicle recording control device 100 causes the recording function control unit 123 to cause the recording unit 220 to store the event recorded data of a predetermined period before and after, and including the time when the event is detected that is generated by the video data processing unit 122, and finishes the present process. When the process is finished in FIG. 6, the process proceeds to step S104 in FIG. 4. While the second parking recording function is performed continuously, the vehicle recording control device 100 performs the processes from step S122 to step S124.

In this manner, when it is determined that the vehicle is in an environment where there is a high risk of an object colliding with the vehicle, the second parking recording is performed instead of the first parking recording.

As described above, in the present embodiment, when it is determined that the vehicle is in an environment where there is a high risk of an object colliding with the vehicle, loop recording is performed. With the present embodiment, when it is determined that the vehicle is in an environment where there is a high risk collision, the video data of a predetermined period before and after the time when the event is detected can be stored as the event recorded data. With the present embodiment, the loop recording is only performed, when it is determined that the vehicle is in an environment where there is a high risk of collision. Consequently, it is possible to reduce power consumption. Thus, the present invention can operate the parking recording function longer than when loop recording is performed continuously.

In the present embodiment, for example, when a gap between the vehicle and the adjacent other vehicle is narrow when the vehicle has parked, loop recording is performed by determining that the vehicle is in an environment where there is a high risk of collision. Moreover, in the present embodiment, when a gap between the vehicle and the adjacent other vehicle is narrow when the vehicle has parked, and when the adjacent other vehicle leaves the parking space while the vehicle is parked, loop recording is performed by determining that the vehicle is in an environment where there is a high risk of collision. Furthermore, in the present embodiment, while the vehicle is parked, when the adjacent other vehicle enters a position where a gap between the vehicle and the adjacent other vehicle is narrow, loop recording is performed by determining that the vehicle is in an environment where there is a high risk of collision. With the present embodiment, when the vehicle is in an environment where there is a high risk of collision, it is possible to store the video data including the time before and after collision is detected, as the event recorded data.

Moreover, in the present embodiment, when it is not determined that the vehicle is in an environment where there is a high risk of an object colliding with the vehicle, only an operation for detecting an event is performed. Then, after the event is detected, the camera 210 is activated, and the captured video data is stored as the event recorded data. With the present embodiment, only an operation for detecting an event is performed. Thus, compared to when loop recording is performed, it is possible to reduce the power consumption. Consequently, the present embodiment can operate the parking recording function longer than when loop recording is performed.

In this manner, with the present embodiment, it is possible to properly record video images while the vehicle is parked.

Second Embodiment

Figure 7:
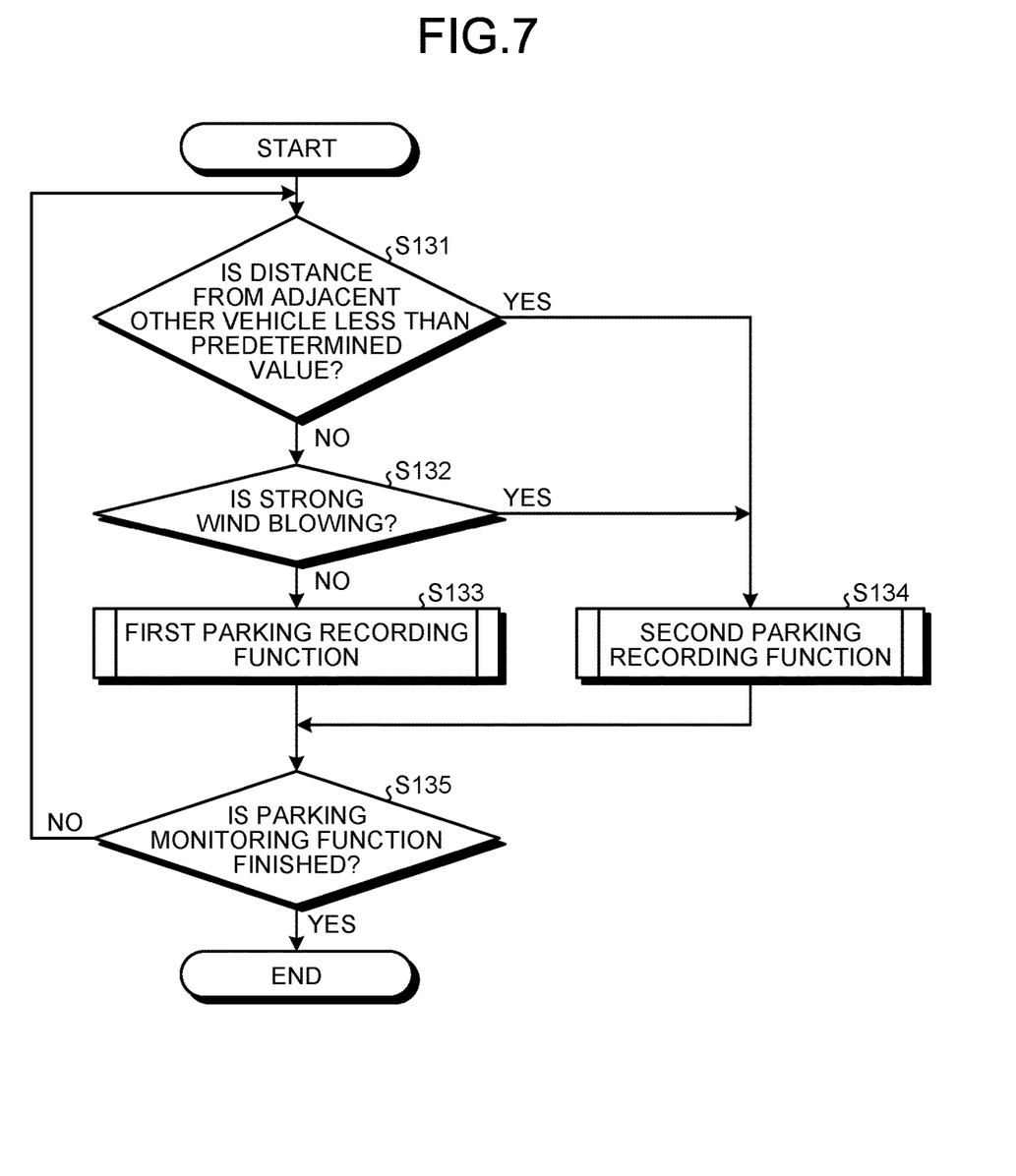
FIG. 7 is a flowchart illustrating a flow of a process performed by a vehicle recording control device according to a second embodiment.

With reference to FIG. 7, the vehicle recording device 10 according to the present embodiment will be described. FIG. 7 is a flowchart illustrating a flow of a process performed by a vehicle recording control device according to a second embodiment. The basic configuration of the vehicle recording device 10 is the same as that of the vehicle recording device 10 in the first embodiment. In the following explanation, the same reference numerals or the corresponding reference numerals are applied to the same components as those in the vehicle recording device 10, and the detailed description thereof will be omitted. The vehicle recording device 10 is different from that in the first embodiment in that the processes performed by the surrounding information acquisition unit 129 and the determination unit 131 are different.

The surrounding information acquisition unit 129 acquires wind speed information in the vicinity of the vehicle as the surrounding information of the vehicle, in addition to the distance from the adjacent other vehicle. The wind speed information in the vicinity of the vehicle is acquired by any method, such as by an on-board anemometer 270, by a short-range wireless communication through an anemometer 270 installed in the vicinity of the vehicle, from an external server via an Internet line, and the like.

On the basis of the surrounding information acquired by the surrounding information acquisition unit 129, the determination unit 131 determines that the vehicle is in an environment where there is a high risk of an object colliding with the vehicle, when the distance from the adjacent other vehicle is less than a predetermined value, and when the intensity of wind speed is equal to or higher than a threshold.

Next, with reference to FIG. 7, a flow of a process performed by the vehicle recording control device 100 will be described. The processes at step S131 and from step S133 to step S135 in FIG. 7 are the same as the processes at step S106, step S107, step S108, and step S104 in the flowchart illustrated in FIG. 4.

The vehicle recording control device 100 determines whether a strong wind is blowing (step S132). More specifically, on the basis of the wind speed information acquired by the surrounding information acquisition unit 129, the vehicle recording control device 100 determines whether a strong wind is blowing, by determining whether the intensity of wind speed is equal to or higher than a threshold. When the intensity of wind speed is equal to or higher than a threshold, the vehicle recording control device 100 determines that a strong wind is blowing (Yes at step S132), and proceeds to step S134. When the intensity of wind speed is not equal to or higher than a threshold, the vehicle recording control device 100 determines that a strong wind is not blowing (No at step S132), and proceeds to step S133.

The surrounding information acquisition unit 129 may also acquire wind power information instead of the wind speed information. For example, the threshold of the wind speed used for the determination at step S132 is a threshold such that the door of the vehicle is opened by wind, when the door is opened or closed. For example, the wind speed is 10 m/s and the like.

In this manner, when the distance between the adjacent other vehicle and the vehicle becomes less than a predetermined value, and when a strong wind is blowing around the vehicle, it is determined that the vehicle is in an environment where there is a high risk of an object colliding with the vehicle. Consequently, the second parking recording is performed instead of the first parking recording.

As described above, in the present embodiment, when the distance between the adjacent other vehicle and the vehicle becomes less than a predetermined value, and when a strong wind is blowing around the vehicle, it is possible to perform loop recording, by determining that the vehicle is in an environment where there is a high risk of an object colliding with the vehicle. For example, with the present embodiment, when a strong wind is blowing, it is possible to properly store the video data including the time before and after the door of the adjacent other vehicle swung open and hit the vehicle due to the strong wind, as the event recorded data.

The vehicle recording device 10 according to the present invention may be implemented in various other modifications in addition to the embodiments described above.

The components of the vehicle recording device 10 illustrated in the drawings are functionally conceptual, and need not necessarily be physically configured as illustrated. In other words, the specific modes of the devices are not limited to those illustrated in the drawings, and all or a part thereof may be functionally or physically dispersed or integrated in an optional unit according to the processing load or usage status of each device.

For example, the component of the vehicle recording device 10 may be implemented as a computer program loaded in the memory, as software. In the embodiments described above, the components are described as functional blocks implemented by the cooperation of hardware and software. In other words, these functional blocks can be implemented in various forms by hardware alone, software alone, or a combination thereof.

The components described above include components that can be easily assumed by a person skilled in the art, and components that are substantially the same. Moreover, the components described above can be combined as appropriate. Furthermore, various omissions, replacements, and changes may be made without departing from the spirit of the present invention.

The present invention can properly record video images while a vehicle is parked.

What is claimed is:
1. A vehicle recording control device, comprising:
a processor configured to:
A) acquire video data captured by an imager for capturing an image of a surrounding of a vehicle;
B) detect an event occurring on the vehicle;
C) operate a parking recording function for storing the video data based on detection of the event, while the vehicle is parked;
D) acquire surrounding information of the vehicle; and

E) determine whether the vehicle is in an environment where there is a high risk of an object colliding with the vehicle, based on the surrounding information acquired in step D), wherein
- depending on a determination made in step E), it is performed in step C) to switch between: a first parking recording that causes the imager to start capturing the image upon detecting the event and that stores video data of a predetermined period in the first parking recording, as event recorded data; and a second parking recording that continuously records video data captured by the imager, that cuts out pieces of video data from the recorded video data by the imager, and upon detecting the event, that stores the pieces of video data in the second parking recording associated with periods of before and after a time when the event is detected,
- it is performed in step D) to acquire wind speed information in a vicinity of the vehicle in addition to a distance from another vehicle that is the object adjacent to the vehicle, as the surrounding information of the vehicle, and
- it is determined in step E) that the vehicle is in the environment where there is the risk of the object colliding with the vehicle, when the distance from the other vehicle adjacent to the vehicle is less than the predetermined value, and when an intensity of wind speed is equal to or higher than a threshold.

2. The vehicle recording control device according to claim 1, wherein
- when it is determined in step E) that the vehicle is not in the environment where there is the risk of the object colliding with the vehicle, the first parking recording is performed in step C), and
- when it is determined in step E) that the vehicle is in the environment where there is the risk of the object colliding with the vehicle, the second parking recording is performed in step C).

3. The vehicle recording control device according to claim 1, the processor is further configured to:
F) detect that the other vehicle is moving in the surrounding of the vehicle, wherein
- it is performed in step D) to acquire the surrounding information when the vehicle is parking, and
- it is determined in step E) that the vehicle is in the environment where there is the risk of the other vehicle colliding with the vehicle, when the distance from the other vehicle adjacent to the vehicle is less than the predetermined value, and when the movement of the other vehicle that is adjacent to the vehicle is detected after the vehicle is parked.

4. The vehicle recording control device according to claim 1, the processor is further configured to:
G) detect that the other vehicle is moving in the surrounding of the vehicle, wherein
- it is performed in step D) to acquire the surrounding information after the vehicle is parked, and
- it is determined in step E) that the vehicle is in the environment where there is the risk of the other vehicle colliding with the vehicle, when the distance between the vehicle and the other vehicle is detected while the vehicle is parked is reduced to less than the predetermined value.

5. A vehicle recording device, comprising:
the vehicle recording control device according to claim 1; and
at least one of the imager that captures the image of the surrounding of the vehicle, and a recorder that stores video data.

6. A vehicle recording control method, comprising:
a step of acquiring surrounding information that acquires surrounding information when a vehicle is parking;
a step of determining that determines whether the vehicle is in an environment where there is a risk of an object colliding with the vehicle, based on the surrounding information acquired at the step of acquiring surrounding information; and
a step of controlling recording function that switches between: a first parking recording that causes an imager for capturing an image of a surrounding of the vehicle to start capturing the image upon detecting an event occurring on the vehicle and that stores video data of a predetermined period in the first parking recording, as event recorded data; and a second parking recording that continuously records video data captured by the imager, that cuts out pieces of video data from the recorded video data by the imager, and upon detecting the event occurring on the vehicle, that stores the pieces of video data in the second parking recording associated with periods of before and after a time when the event is detected, depending on a determination made at the step of determining,
it is performed in the step of acquiring to acquire wind speed information in a vicinity of the vehicle in addition to a distance from another vehicle that is the object adjacent to the vehicle, as the surrounding information of the vehicle, and
it is determined in the step of determining that the vehicle is in the environment where there is the risk of the object colliding with the vehicle, when the distance from the other vehicle adjacent to the vehicle is less than the predetermined value, and when an intensity of wind speed is equal to or higher than a threshold.

7. A non-transitory computer readable recording medium storing therein a computer program for causing a computer operating as a vehicle recording control device to execute:
a step of acquiring surrounding information that acquires surrounding information when a vehicle is parking;
a step of determining that determines whether the vehicle is in an environment where there is a risk of an object colliding with the vehicle, based on the surrounding information acquired at the step of acquiring surrounding information; and
a step of controlling recording function that switches between: a first parking recording that causes an imager for capturing an image of a surrounding of the vehicle to start capturing the image upon detecting an event occurring on the vehicle and that stores video data of a predetermined period in the first parking recording, as event recorded data; and a second parking recording that continuously records video data captured by the imager, that cuts out pieces of video data from the recorded video data by the imager, and upon detecting the event occurring on the vehicle, that stores the pieces of video data in the second parking recording associated with periods of before and after a time when the event is detected, depending on a determination made at the step of determining,
it is performed in the step of acquiring to acquire wind speed information in a vicinity of the vehicle in addition to a distance from another vehicle that is the object adjacent to the vehicle, as the surrounding information of the vehicle, and it is determined in the step of determining that the vehicle is in the environment where there is the risk of the object colliding with the vehicle, when the distance from the other vehicle adjacent to the vehicle is less than the predetermined value, and when an intensity of wind speed is equal to or higher than a threshold.

* * * * *